Feb. 15, 1966  F. A. FASSBENDER  3,234,916
COMBINED WRITING IMPLEMENT AND PIPE TOOL
Filed Jan. 21, 1964
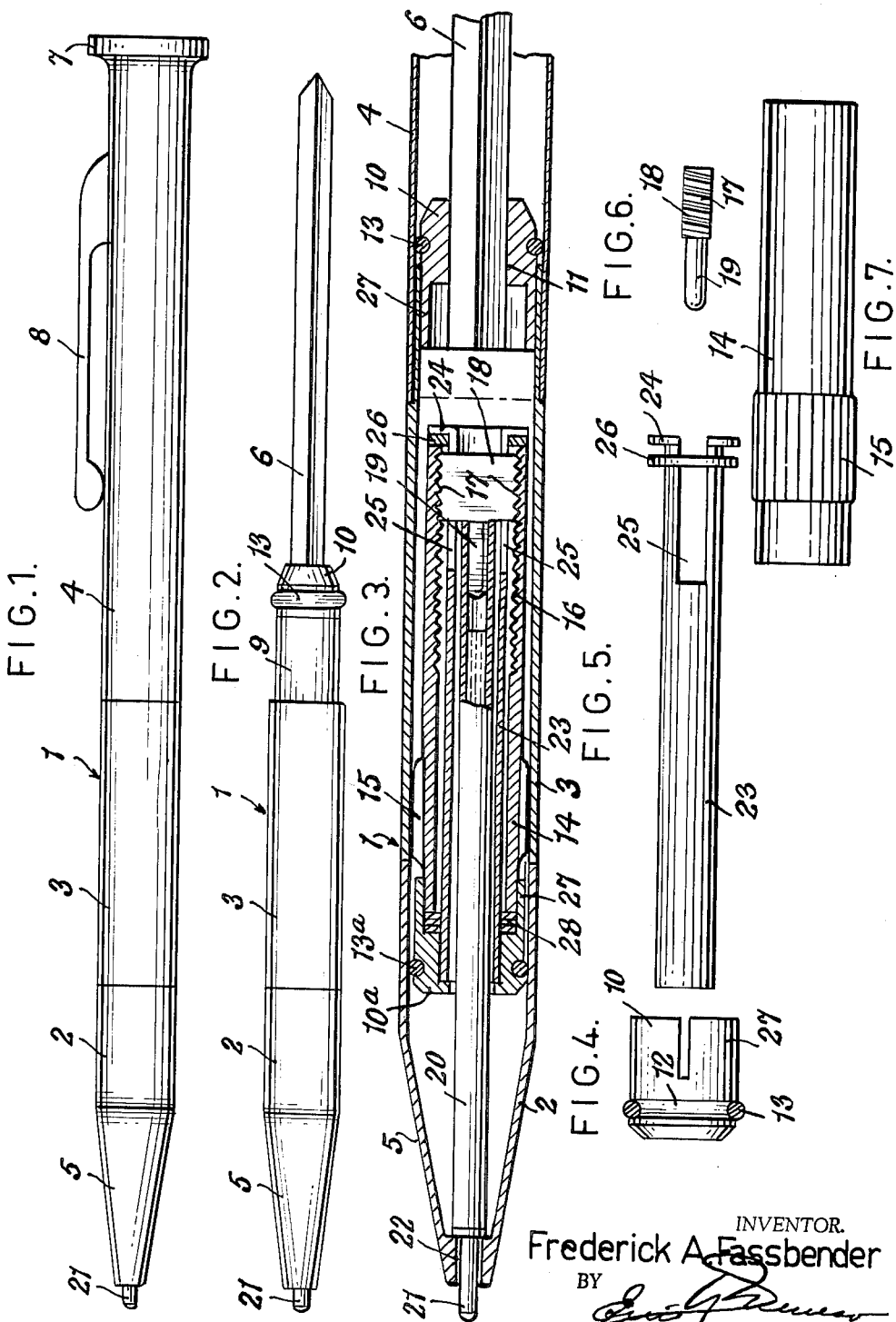
INVENTOR.
Frederick A. Fassbender
BY
Attorney

United States Patent Office 3,234,916
Patented Feb. 15, 1966

3,234,916
COMBINED WRITING IMPLEMENT AND PIPE TOOL
Frederick A. Fassbender, West Orange, N.J., assignor to S. M. Frank & Co., Inc., New York, N.Y., a corporation of New York
Filed Jan. 21, 1964, Ser. No. 339,168
1 Claim. (Cl. 120—1)

This invention relates to a combined writing implement such as a ball-point pen and a smoking pipe tool, and one of the objects of the invention is to provide an implement of this kind which shall present the general appearance of a conventional ball-point pen yet will provide the smoker with not only the uses of the implement for writing purpuoses but will also provide tool elements which can be usefully employed by a pipe smoker, such as a reamer and a tobacco tamper.

It is an object of the invention to provide a device of this character composed of parts which can be easily assembled; which will have its barrel sections frictionally maintained in co-operative position by means of an O-ring arrangement that will permit separation of such parts when required, and without the use for tools, of the several barrel sections of the implement.

More particularly, the invention contemplates the provision of an implement generally resembling in external appearance, a ball-point pen, the same being provided internally with a ball-point pen cartridge and with advancing and retracting mechanism actuated by the rotative movement of the forward part of the barrel of the implement. The invention contemplates the provision on a part of the barrel of the implement, of a pipe reamer that projects rearwardly and is normally covered and protected by a rear removable part of the barrel, and said rear part of the barrel terminates at its rear end in a disk-shaped head forming a tamper for compressing the tobacco in a pipe. The invention further contemplates the use of friction-exerting means, such as compressible O-rings suitably mounted, to securely but removably holding together the several sections of the barrel of the implement.

With these and other objects to be hereinafter set forth in view, I have devised the arrangement of parts to be described and more particularly pointed out in the claim appended hereto.

In the accompanying drawing, wherein an illustrative embodiment of the invention is shown, FIG. 1 is a side elevational view of a combined ball-point pen and pipe smokers' tool made in accordance with the invention;

FIG. 2 is a view of the tool with the rear section of the barrel removed in order to shown the pipe reamer;

FIG. 3 is a longitudinal sectional view of the forward portion of the implement showing the pen advancing and retracting mechanism;

FIG. 4 shows one of the grooved O-ring-bearing caps;

FIG. 5 shows the innermost tube or sleeve of the mechanism for advancing or retracting the pen cartridge;

FIG. 6 shows the threaded follower, and

FIG. 7 shows the outer tube.

The implement as disclosed in the drawing has a tubular barrel generally indicated at 1. Said barrel is composed of three main tubular sections indicated respectively at 2, 3 and 4. The forward barrel section shown at 2 is conical at its front end as indicated at 5. The central section of the barrel, or that section shown at 3, houses the propelling mechanism for the pen cartridge, and the rear barrel section shown at 4 is an end closure and the same covers and protects a pipe stem reamer shown at 6.

At its rear end the barrel section 4 is provided with a disk-shaped head 7, the same constituting a tamper for compressing the tobacco in the bowl of a pipe. This rear section of the barrel carries a clip 8 of known form.

The central section 3 of the barrel is provided with a portion 9 of reduced diameter and over which the rear barrel section 4 is removably and telescopically fitted, and when the rear barrel section is so fitted in place on the part 9 as shown in FIG. 1, its peripheral surface will be substantially flush with the exposed surface of the barrel section 3.

The rear portion 9 of the central barrel section 3 is provided with a plug 10 such as that shown in FIG. 4, the plug being firmly fitted in place in the rear end of the central barrel section. Said plug is formed with an axial opening 11 in which one end of the reamer 6 is securely anchored. The plug 10 is formed with a circumferential groove 12 in which a compressible O-ring 13 is fitted. The O-ring projects out of the groove 12 to a sufficient extent to cause it to frictionally bear against the inner surface of the wall of the tubular rear barrel section 4 when said barrel section is fitted over the part 9 of the central barrel section. The frictional engagement between the compressible and resilient O-ring and the inner surface of the rear barrel section is such as to enable the rear barrel section to firmly remain in place on the rear end of the central barrel section 3 during the handling and use of the implement, yet the rear barrel section can be readily removed by the exertion of an axial pull on it, to thus expose the reamer 6 for use.

The central section 3 of the barrel sections houses the pen mechanism shown in FIG. 3 and which includes an outer tube or sleeve 14 fixed within the barrel section 3 by being force-fitted therein. The knurled area 15 provided on the tube 14 holds the tube securely in the barrel section 3. The interior of the outer tube 14 is provided for a portion of its length and extending forwardly from its rear end, with screw threads 16. Said threads 16 are engaged by the threads 17 provided on the upper and lower edges of a follower 18 so that when rotative movement of the follower takes place, the follower will be moved forward or will be retracted according to the direction of rotation of the follower.

The follower 18 is in the form of a plate and is provided at its forward end with a projecting pin 19 for fitment within the rear end of an ink cartridge 20 substantially as shown in FIG. 3. The ink cartridge 20 may be of conventional form and is thus provided with the usual ball-point 21 which projects out of the front opening 22 of the forward barrel section 2 when the cartridge is advanced to writing position as shown in FIGS. 1 and 2.

Concentrically arranged within the outer tube 14 and adapted for rotative movement within the same, is an inner tube or sleeve 23. The same has a flanged rear end 24 and is slotted inwardly from said end as indicated at 25. The follower 18 projects through the slots 25 so that its threaded edges 17 can reach and engage with the threads 16 on the interior of the outer tube 14. The follower is confined in the slots through the use of a washer 26 fitting around the inner tube.

Fitted on the forward end of the inner tube 23 is a cap 10a which is substantially similar to that shown at 10, said cap 10a having a split skirt 27 which fits around the outside of the outer tube 14. The cap 10a is provided with the annular circumferential groove 12 that receives an O-ring 13a. Suitable washers 38 may be interposed between the cap 10a and the forward end of the outer tube 14.

The forward barrel section 3 is slidably fitted in place as shown in FIG. 3, and when it is so fitted, its inner surface will be frictionally engaged by the O-ring 10a, this engagement being such that the front barrel section will not only be securely held in the required position but it will be coupled, by means of the cap 10a having its O-ring engaging the barrel section, to the rotatable inner tube 23. This arrangement is such that when the forward barrel section 3 is manually rotated, the inner tube 23 will consequently be rotated and the follower 18 will be rotated with the inner tube. As the follower is thus rotated, the engagement of its threads 17 with the threads 16 in the outer sleeve 14, will cause the follower 18 and the ink cartridge 20 engaged by the follower to be advanced to writing position or else have its point 21 retracted to a position within the barrel section 3.

The frictional engagement between the front barrel section 2 and the O-ring 10a is such that the barrel section 2 is securely held in the proper position during the use of the implement for both writing and pipe use, but when it is desired to renew an ink cartridge the forward barrel section 2 can be readily removed by a manual pull imposed on it, when the cartridge will be thus exposed for removal and replacement.

The tool is such that it presents the appearance of an attractive writing implement and it not only affords the user the facilities of such an implement but provides for the uses of a pipe tool as well. The manner in which the parts of the tool are assembled and are coupled together in operative relationship is such as to provide quick and easy assembly and provide for the easy exposure of the reamer and the ink cartridge when required.

Having thus described an embodiment of the invention, it is obvious that the same is not to be restricted thereto, but is broad enough to cover all structures coming within the scope of the annexed claim.

What I claim is:

A combined writing implement and smoker's pipe tool having a barrel comprising a forward hollow section, a central tubular section and a rear cap section, the forward and central sections containing writing implement advancing-and-retracting means, said central section including a rear, outer reduced cross-section, a plug having a split skirt frictionally fitted into and inwardly of the rear end of the central section, a pipe reamer anchored at one end in the plug and rear end of and projecting axially therefrom the central barrel section, the cap section being closed at its rear end by a flat disk comprising a tobacco tamper, said cap section being telescopically and removably fitted over the rear reduced diameter end of the central section and enclosing the reamer, the plug having a tapered rear end and projecting from the rear end of said central section and having an annular groove between said tapered end and the skirt at the rear end of said central section, and a soft and resilient, compressible O-ring fitted in said groove and overlying the rear end of said central section and frictionally and removably engaging the inner surface of the cap member for resisting displacement of the cap member from the rear end of the central barrel section.

References Cited by the Examiner

UNITED STATES PATENTS

| | | | |
|---|---|---|---|
| 1,035,665 | 8/1912 | Vaughn et al. | 120—42.05 |
| 1,283,860 | 11/1918 | Mitchell | 120—42.01 |
| 2,110,999 | 3/1938 | Miga | 120—1 X |
| 2,278,907 | 4/1942 | Baker | 120—42.05 |
| 2,602,422 | 7/1952 | Shea | 120—42.05 |

EUGENE R. CAPOZIO, *Primary Examiner.*

LAWRENCE CHARLES, JEROME SCHNALL,
*Examiners.*